Patented May 27, 1930

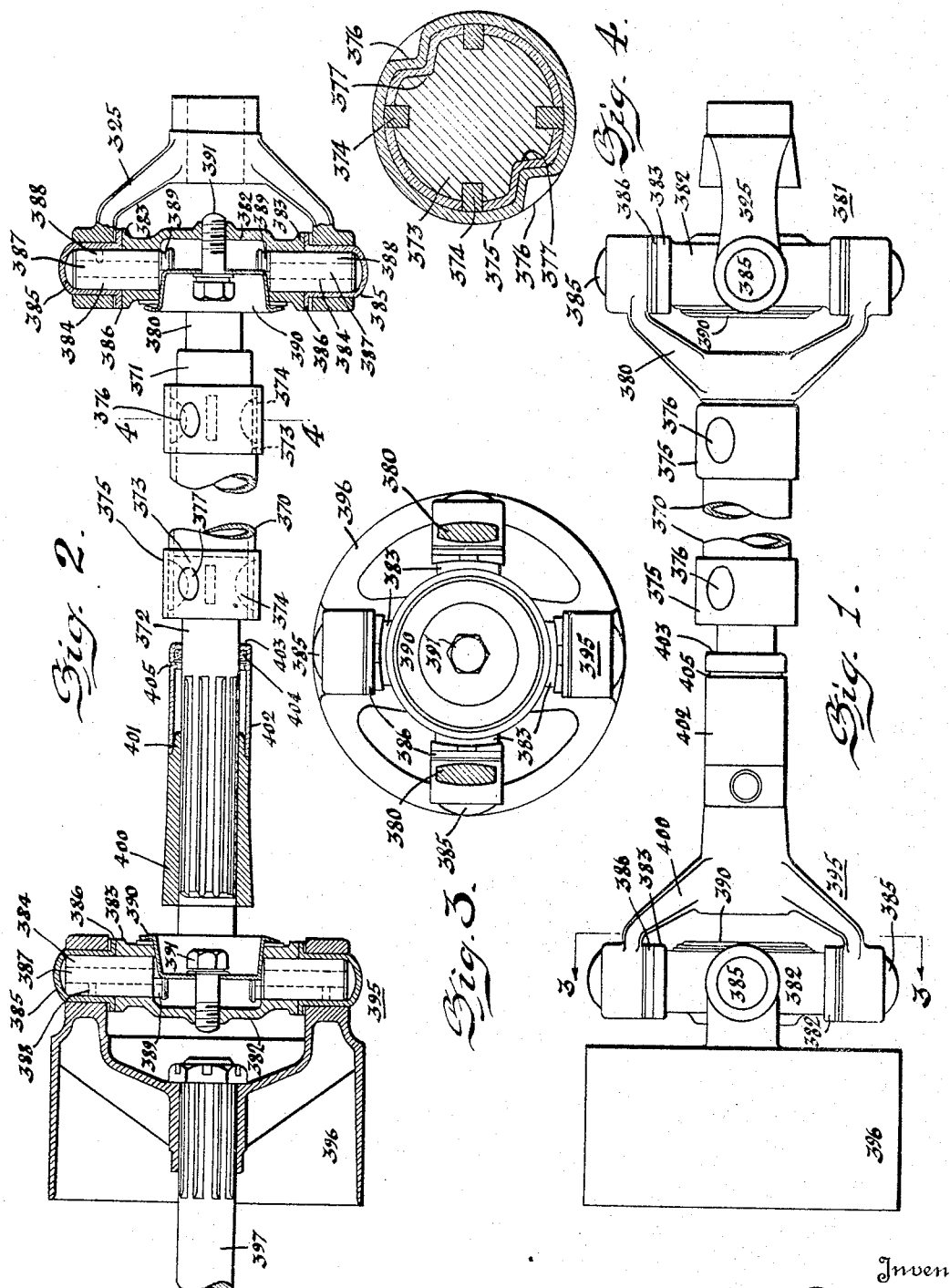

1,760,845

UNITED STATES PATENT OFFICE

CHARLES F. KETTERING, OF DAYTON, OHIO, AND CHARLES R. SHORT, OF DETROIT, MICHIGAN, ASSIGNORS TO GENERAL MOTORS RESEARCH CORPORATION, OF DAYTON, OHIO, A CORPORATION OF DELAWARE

DRIVE-SHAFT CONNECTION FOR MOTOR-DRIVEN VEHICLES

Original application filed April 15, 1922, Serial No. 553,075. Divided and this application filed January 24, 1927. Serial No. 163,218.

Our invention relates to motor driven vehicles, and particularly to the universal joint and elements immediately associated therewith through which the rear wheels of the vehicle are driven from the engine thereof. The object of our invention is to provide certain improvements in and relating to such joints all as will hereinafter and at length appear, this present application being a division of our previously filed application Serial Number 553,075, filed April 15, 1922.

Referring now to the drawing accompanying and forming a part of this specification, and wherein the preferred embodiment of our invention is illustrated.

Figure 1 is a view showing two universal joints made in accordance with our invention, with a conventional propeller shaft between them in accordance with the usual practice in motor driven vehicles.

Figure 2 is a view like unto Figure 1, but with parts sectioned to better explain our invention.

Figure 3 is a view showing a section upon a transverse plane indicated by the line 3—3, Figure 1.

Figure 4 is a view showing a section upon a transverse plane indicated by the line 4—4, Figure 2.

Referring now to the drawing for a more complete understanding of our invention, the propeller shaft illustrated is tubular, and is shown with a portion omitted at 370. The tubular portion is connected at each of its ends to small sections of solid shafting indicated at 371 at the rear differential gearing end, and 372 at the transmission end, the section 371 being integral with a yoke of a universal joint as will hereinafter appear. These solid shaft portions are connected to the tube in the manner shown more clearly in Figures 2, and 4, the solid shafts being provided with portions 373 of a size forming a press fit within the ends of tube. These ends are also provided with slots for keys indicated at 374, and corresponding slots are also made in the ends of tube.

In assembling the shaft the ends 373 are forced into place in the ends of tube, keys 374 are inserted, and a ring 375 is placed on over the end of tube and over the keys in order to hold the latter in place. In order to hold the ring in position depressions 376 are made at opposite sides of the ring by means of a suitable tool which forces the metal of the ring and the metal of the tube into corresponding depressions 377 in the shaft end 373. Shaft end 371 has securely attached thereto a yoke 380 forming a portion of the rear universal joint of which the yoke 325 is a part. This last mentioned yoke is connected with a short shaft, not shown, through which the rear axle of the vehicle is driven through the usual differential gearing.

The rear universal joint, which will be designated as a whole by the numeral 381, consists of the two yokes 325 and 380, a spider block 382 to which these yokes are pivoted at right angles to each other, pivoting means. and a cover for a central opening in the block. The block 382 is circular and is open on one side, and has bosses 383 projecting from each quadrant thereof, which bosses are drilled radially thereby furnishing passages for the pins 384 upon which the yokes are pivoted. In order to furnish bearings for the pins and provide for the retention of lubricant within the bearings, the arms of the yoke are each provided with a bushing 385 in the form of a thimble. These bushings are pressed into the arms of the yoke from the inside, as is indicated in Figure 2. The thimbles are also provided each with a flange 386 which flanges form bearings for the ends of the bosses 383. The pins 384 are of such a size as to fit within the holes in the bosses 383 and extend from the central opening in the block 382 into the thimbles 385, and substantially to the ends thereof. These pins are drilled longitudinally, as at 387, and are also provided with a small lateral opening 388 for the purpose of allowing lubricant supplied to the central cavity to be forced to the ends and sides of the pins by centrifugal action. The inner end of each of the pins is provided with means such as the groove 389 enabling them to be withdrawn from their seats; and each pin has one-half of the inner end removed for the purpose of securing the pins against rotation when the cover 390 is in place, as shown in Figure 2.

The assembly of the joint is readily indicated by its structure and is accomplished by positioning the yokes over the bosses and inserting the pins from the central cavity of the block 382. After this has been done the cover 390 is placed in position and secured by means of a bolt 391. This cover 390 serves not only as a cover to prevent escape of lubricant from the joint, but also acts as a positioning means for the pins 384, as is clearly indicated in Figure 2.

The universal joint at the transmission end of the propeller shaft is designated as a whole by the numeral 395, and is exactly the same in form as universal joint 381 except that the yoke attached to the transmission shaft is formed as a part of the transmission brake drum 396, which drum is secured to the rear end of the transmission shaft 397.

The propeller shaft includes also the slip joint which is formed upon the splined end of shaft 372, as shown in Figure 2. This slip joint comprises the universal joint yoke 400 which is a part of the tubular member of the slip joint as shown in Figure 2. This tubular member is internally splined to coact with the splined shaft 372 thus permitting longitudinal extensions without relative rotational movement. The member 400 is also provided with a reduced portion 401 serving as a seat for the metal tube 402 upon which reduced portion the tube is secured. The other end of tube 402 is spun over to form a flange 403 behind which is a felt washer 404 secured against longitudinal movement by the ring 405 rolled into the wall of tube 402.

Having thus described and explained our invention we claim and desire to secure by Letters Patent.

In a universal joint of the class described, a yoke member having a short shaft section formed integrally therewith, and a keyway formed in the peripheral surface thereof, and having also a depression substantially conical in form in its peripheral surface; a tubular shaft fitting over said shaft section and having a keyway arranged to register with said first mentioned keyway; a key within said keyway; and a ring surrounding the end of said tubular shaft and overlying said key to keep it in place within said keyways, portions of the walls of said ring and shaft being forced into the depression aforesaid to thereby fasten the parts together in a permanent manner.

In testimony whereof we have signed our names to this specification.

CHARLES F. KETTERING.
CHARLES R. SHORT.